United States Patent
Jungert et al.

(10) Patent No.: US 8,182,026 B2
(45) Date of Patent: May 22, 2012

(54) COCKPIT CROSS MEMBER FOR A MOTOR VEHICLE

(75) Inventors: Dieter Jungert, Weissach (DE); Joachim Muller, Rutesheim (DE)

(73) Assignee: Dr. Ing. h.c.F Porsche Aktiengesellschaft (DE)

( * ) Notice: Subject to any disclaimer, the term of this patent is extended or adjusted under 35 U.S.C. 154(b) by 90 days.

(21) Appl. No.: 12/538,302

(22) Filed: Aug. 10, 2009

(65) Prior Publication Data
US 2010/0090498 A1    Apr. 15, 2010

(30) Foreign Application Priority Data
Oct. 10, 2008 (DE) .......... 10 2008 052 007

(51) Int. Cl.
  *B60J 7/00* (2006.01)
(52) U.S. Cl. .................................. 296/193.02
(58) Field of Classification Search ......... 296/193.02, 296/72, 208, 70; 114/361, 363, 347, 354; 244/118.5
See application file for complete search history.

(56) References Cited

U.S. PATENT DOCUMENTS

| | | | | |
|---|---|---|---|---|
| 2,685,846 A * | 8/1954 | Gassner et al. | | 105/4.3 |
| 3,114,336 A * | 12/1963 | Schroeder et al. | | 410/149 |
| 4,237,412 A | 12/1980 | Rundlor | | |
| 4,927,109 A * | 5/1990 | Wilson | | 248/354.3 |
| 5,141,197 A * | 8/1992 | Mackaay | | 248/439 |
| 6,351,962 B1 * | 3/2002 | Mizutani et al. | | 62/244 |
| 6,581,967 B1 * | 6/2003 | Logan et al. | | 280/779 |
| 6,685,259 B1 * | 2/2004 | Shimase et al. | | 296/203.02 |
| 6,705,671 B1 * | 3/2004 | Glovatsky et al. | | 296/193.02 |
| 6,837,518 B2 * | 1/2005 | Mullan | | 280/752 |
| 6,869,132 B2 * | 3/2005 | Wang et al. | | 296/187.12 |
| 6,942,910 B2 * | 9/2005 | Roberts et al. | | 428/35.8 |
| 6,955,394 B1 * | 10/2005 | Reddig et al. | | 296/208 |
| 6,988,764 B2 * | 1/2006 | Matsutani | | 296/193.02 |
| 7,086,665 B2 * | 8/2006 | Lee | | 280/779 |
| 7,150,489 B2 * | 12/2006 | Yoshida et al. | | 296/72 |
| 7,216,927 B2 * | 5/2007 | Luo et al. | | 296/193.02 |
| 7,237,831 B2 * | 7/2007 | Yamamoto et al. | | 296/193.04 |
| 7,267,387 B1 * | 9/2007 | Bruford et al. | | 296/57.1 |
| 7,284,789 B2 * | 10/2007 | Wolf | | 296/208 |
| 7,367,613 B2 * | 5/2008 | Ellison et al. | | 296/193.02 |
| 7,407,221 B2 * | 8/2008 | Kring et al. | | 296/193.02 |
| 7,484,792 B2 * | 2/2009 | Penner | | 296/187.05 |
| 7,503,622 B2 * | 3/2009 | Vican | | 296/190.03 |
| 7,516,986 B2 * | 4/2009 | Kokubo | | 280/779 |
| 7,658,439 B2 * | 2/2010 | Meier | | 296/193.02 |
| 7,703,829 B2 * | 4/2010 | Miki | | 296/72 |
| 7,874,587 B2 * | 1/2011 | Miki et al. | | 280/752 |
| 7,891,726 B2 * | 2/2011 | Gavrilov | | 296/187.05 |

(Continued)

FOREIGN PATENT DOCUMENTS

DE    195 41 773    5/1997

(Continued)

*Primary Examiner* — Kiran B Patel
(74) *Attorney, Agent, or Firm* — Gerald E. Hespos; Michael J. Porco

(57) ABSTRACT

A cockpit cross member (1,1',1") for a motor vehicle, has a basic member (2) and at least one fastening bracket (3) for connecting the cockpit cross member to the vehicle body (4). The basic member (2) is designed as a light-metal cast structure, and an adjusting element (18, 19, 20, 21, 22, 23) is provided between the basic member (2) and the fastening bracket (3) to at least partially absorb the force exerted on the cockpit cross member in the event of the motor vehicle crashing.

10 Claims, 1 Drawing Sheet

U.S. PATENT DOCUMENTS

| | | | |
|---|---|---|---|
| 7,909,388 B2 * | 3/2011 | Gavrilov et al. | 296/187.12 |
| 2004/0135400 A1 * | 7/2004 | Matsuzaki et al. | 296/193.02 |
| 2005/0001450 A1 * | 1/2005 | Cooper et al. | 296/193.02 |
| 2005/0110302 A1 * | 5/2005 | Riha et al. | 296/193.02 |
| 2006/0017309 A1 * | 1/2006 | Wolf | 296/193.02 |
| 2007/0194605 A1 * | 8/2007 | Merkle et al. | 296/193.02 |
| 2009/0152898 A1 * | 6/2009 | Kawamura et al. | 296/193.02 |
| 2010/0001552 A1 * | 1/2010 | Kim | 296/193.02 |
| 2010/0171339 A1 * | 7/2010 | Zornack et al. | 296/193.02 |
| 2010/0276958 A1 * | 11/2010 | Jungert et al. | 296/35.1 |
| 2010/0289296 A1 * | 11/2010 | Brancheriau | 296/193.02 |

FOREIGN PATENT DOCUMENTS

| | | |
|---|---|---|
| DE | 199 26 636 | 12/2000 |
| DE | 10 2005 055 08 | 5/2007 |
| DE | 10 2006 004 14 | 8/2007 |
| DE | 10 2006 043 262 | 3/2008 |
| DE | 10 2008 006 608 | 8/2009 |
| EP | 1 647 469 | 11/2004 |

* cited by examiner

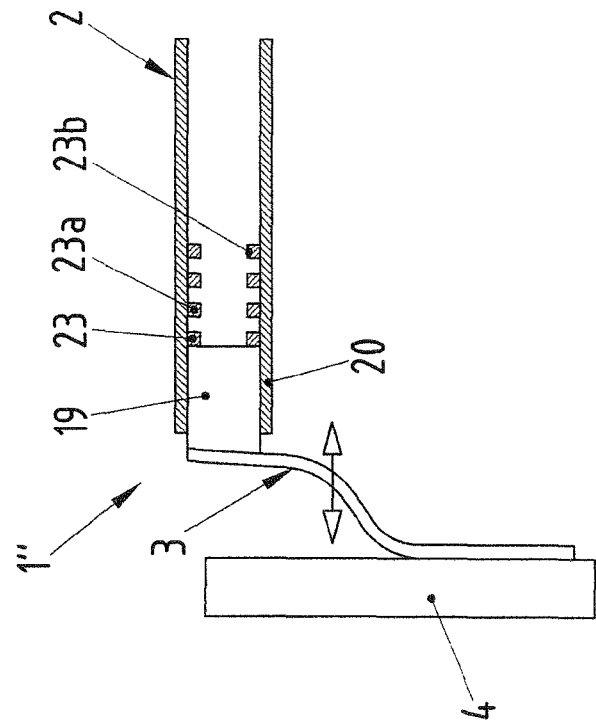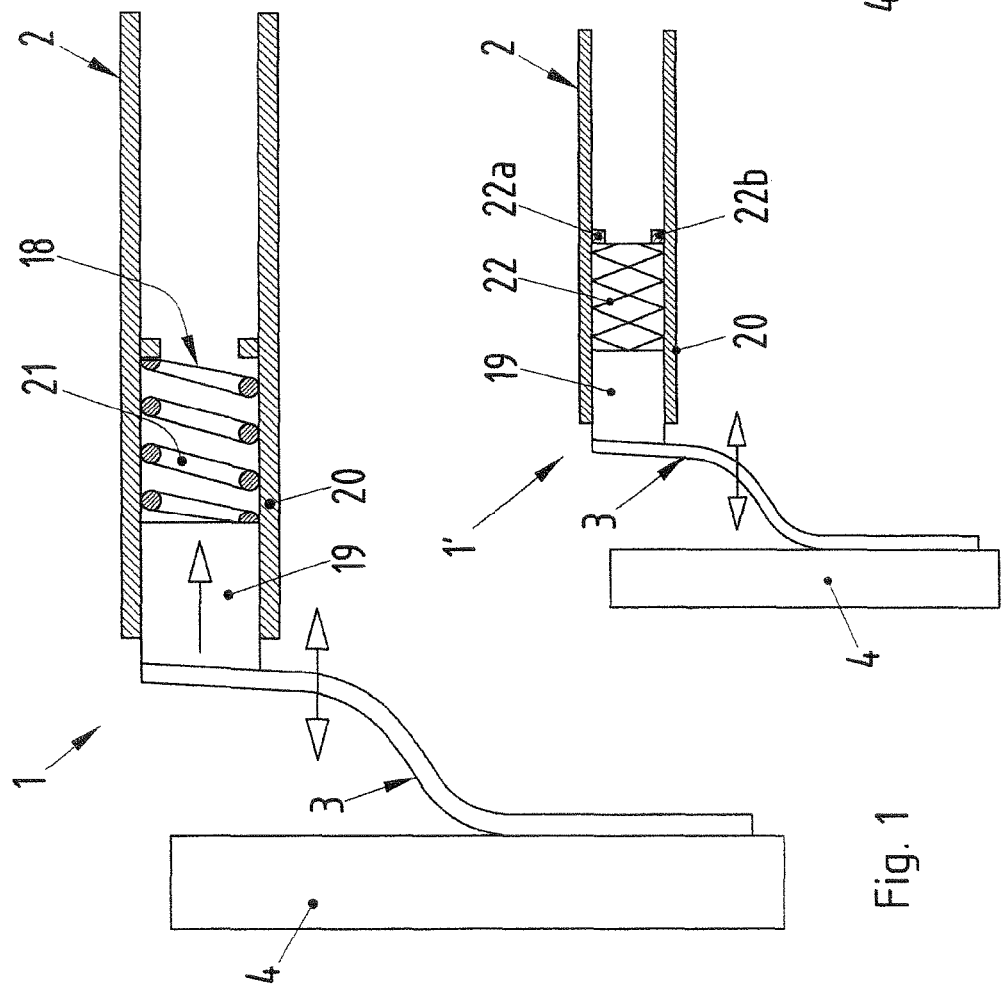

COCKPIT CROSS MEMBER FOR A MOTOR VEHICLE

CROSS-REFERENCE TO RELATED APPLICATIONS

This application claims priority under 35 USC 119 to German Patent Application No. 10 2008 052 007.1 filed on Oct. 10, 2008, the entire disclosure of which is incorporated herein by reference.

BACKGROUND OF THE INVENTION

1. Field of the Invention

The invention relates to a cockpit cross member for a motor vehicle.

2. Description of the Related Art

DE 199 26 636 A1 is assigned to the assignee of the subject invention and relates to a cockpit cross member for a motor vehicle. The cockpit cross member has a tubular basic member onto which two lateral fastening brackets can be pushed and fixed. The fastening brackets virtually completely surround some regions of the basic member and are connectable to the motor vehicle body by a fastening plate.

DE 10 2008 006 608 also is assigned to the assignee of the subject invention and discloses another cockpit cross member. DE 10 2008 006 608 was first published after the above-identified priority date.

It is the object of the invention to provide an improved cockpit cross member of the type disclosed in DE 199 26 636 A1 and in DE 10 2008 006 608.

SUMMARY OF THE INVENTION

The invention is based on the finding that, in the case of a conventional cockpit cross member with a steel basic member, the plastic deformability and/or the high rigidity of the steel results in the basic member and/or the cockpit cross member having good properties in the event of the motor vehicle crashing. These good properties exist because the force exerted on the cockpit cross member in the event of a crash is dissipated by plastic deformation of the basic member or is absorbed by the rigidity of the basic member and therefore reliably protects the vehicle occupants. However, a steel basic member is undesirably heavy. The use of a basic member made of light metal, for example aluminum or magnesium, therefore is preferred for weight reasons. A light-metal cast structure permits a basic member that is configured in a flexible manner and that is very light. However, light metal is more brittle than steel and has a low modulus of elasticity. A cockpit cross member with a basic member in the form of a light-metal cast structure would break or buckle relatively rapidly in the event of a crash. However, such an uncontrolled brittle fracture and buckling in the event of a crash are undesirable.

The invention was made in view of the findings noted above, and is directed to a cockpit cross member with a basic member being designed as a light-metal cast structure, to at least partially "absorb" the forces occurring in the event of the motor vehicle crashing, and particularly in the event of a side crash in the region of a left or right fastening bracket. For this purpose, an adjusting element is located in the force path in front of the basic member for protection in the event of a crash. The adjusting element here is intended to refer to a component that dissipates a considerable part of the force exerted in the event of the motor vehicle crashing by energy absorption by means of an elastic, plastic and/or collapsing deformation. The arrangement of the adjusting element in the force path in front of the basic member assures that the adjusting element is acted upon first by means of the fastening bracket with the forces that occur in the event of a crash. Therefore, in the event of a crash, a defined force is dissipated reliably and therefore the light-metal cast structure is protected securely against brittle fracture and/or buckling. Thus, the cockpit cross member is particularly light and at the same time reliably ensures the protection of the vehicle occupants in the event of a crash. Additionally or alternatively such an adjusting element may be arranged in front of the basic member in the longitudinal direction of the motor vehicle for at least partially absorbing the forces occurring in the region of a front fastening bracket in the event of a head-on crash.

The basic member preferably is a light-metal cast structure, and an adjusting element preferably is provided between the basic member and fastening bracket to absorb at least part of the force exerted on the cockpit cross member in the event of the motor vehicle crashing. In particular, the basic member is connected to the left or right side of the motor vehicle body by the left or right fastening bracket via at least one adjusting element on the left or right side thereof.

The basic member may be a light-metal cast structure and that the fastening bracket may be designed integrally as an adjusting element for at least partially absorbing the force exerted on the cockpit cross member in the event of the motor vehicle crashing. In particular, the left or right fastening bracket provided for connecting the basic member to the left or right side of the motor vehicle body may also be an adjusting element.

The adjusting element preferably is designed to absorb only some of the forces exerted on the cockpit cross member in the event of a crash. For example, the adjusting element may absorb precisely that part of the force exerted on the cockpit cross member that cannot be absorbed by the basic member without breaking or buckling. Put another way, the forces occurring in the event of a crash are divided modularly between the basic member, which is loaded, for example, up to its fracture limit, and the adjusting element which is located in front of the basic member in the direction of force and absorbs the rest of the forces. This enables the adjusting element to be dimensioned in a manner suitable for requirements by the low deformability of the basic member designed as a light-metal cast structure being taken into consideration.

A vibration-optimized cockpit cross member can be achieved if a lateral fastening bracket is connected to the vehicle body in a lower region of an A pillar of the motor vehicle, for example in the vicinity of the vehicle floor. This vibration-optimization of the cockpit cross member is achieved because, in this region, torsional vibrations, in particular, have only a relatively low amplitude, and therefore the transmission of such torsional vibrations to the cockpit cross member can be reduced significantly.

The adjusting element preferably is surrounded at least partially by the basic member to provide a particularly compact cockpit cross member. For example, the light-metal cast construction of the basic member enables the basic member to be formed easily with an opening for receiving the adjusting element.

The adjusting element preferably comprises a spring element which, in the event of a crash, is deformed elastically by the force exerted on the cockpit cross member. Therefore, a defined portion of the force that occurs in the event of a crash is dissipated reliably.

The adjusting element may comprise a deformation element that is deformed plastically or in a collapsing manner by the force exerted on the cockpit cross member in the event of a crash. The deformation element, for example, may be a honeycomb structure and/or an aluminum extruded profile, and is configured to permit a reliable dissipation of the force exerted in the event of a crash.

Of course, any combinations of the elements described above are possible. For example, a right or left adjusting element may differ in design, or a plurality of adjusting elements or combinations of adjusting elements with elastic, plastic and/or collapsing deformation may be provided. As an alternative or in addition, the lateral fastening bracket can be integrated in the adjusting element, for example if the fastening bracket is connected in the manner of a piston-cylinder arrangement via the adjusting element to the basic member by the piston or the cylinder being designed as a fastening bracket.

BRIEF DESCRIPTION OF THE DRAWINGS

FIG. 1 is a lateral section of a first embodiment of the invention.

FIG. 2 is a lateral section of a second embodiment of the invention.

FIG. 3 is a lateral section of a third embodiment of the invention.

DETAILED DESCRIPTION OF THE PREFERRED EMBODIMENT

Cockpit cross members in accordance with the invention are illustrated in FIGS. 1 to 3 and are identified respectively by the reference numerals 1, 1' and 1". Each of the cockpit cross members 1, 1' and 1" has a basic member 2 that extends over substantially the vehicle width in the transverse direction of the vehicle, and left and right lateral fastening brackets 3. Only a left fastening bracket 3 is illustrated in each of FIGS. 1 to 3 for simplification. The lateral fastening bracket 3 is provided for connecting the cockpit cross member 1, 1', 1" to a vehicle body in the lower region of the A pillar 4. The lateral fastening bracket 3 is designed, for example, as an extruded profile made from light metal, such as aluminum. As an alternative, the lateral fastening bracket 3 is configured as a leaf spring that is flexible in a spring-elastic manner in the transverse direction of the vehicle. The lateral fastening bracket 3 therefore defines a first adjusting element that provides a plastic/collapsing or an elastic deformation in to at least partially absorb a force exerted on the cockpit cross member in the event of a side crash of the motor vehicle.

The basic member 2 shown in FIG. 1 is fit in the lower region of an A pillar 4 via a spring device 18, which functions as a second adjusting element. The spring device 18 is flexible in a spring-elastic manner in the transverse direction of the vehicle, i.e. in the direction of the forces exerted in the event of a side crash. An appropriately configured spring device 18 permits a reliable dissipation of the force exerted on the cockpit cross member 1 in the event of a side crash. The spring device 18 of FIG. 1 is coupled to the fastening bracket 3, which is designed as a leaf spring in the embodiment of FIG. 1. However, the leaf spring shape of the fastening bracket 3 merely is one example and does not constitute any limitation. According to this embodiment of FIG. 1, the spring device is designed in the manner of a piston-cylinder arrangement and accordingly has a piston 19 mounted to permit adjustment by travelling in the transverse direction of the vehicle in a cylinder 20.

The piston 19 enters the cylinder 20 counter to a resetting spring 21. More particularly, the piston 19 of the embodiment shown in FIG. 1 can be arranged on the A pillar 4 or on the lateral fastening bracket 3 or can itself form the lateral fastening bracket 3 while the cylinder 20 is formed on the basic member 2. Of course, the elements of FIG. 1 can be arranged the other way around.

The embodiment of FIG. 2 replaces the spring arrangement by a deformation element 22 as a second adjusting element. The deformation element 22 is supported on projections 22a, 22b. In the arrangement of FIG. 2, a piston-cylinder unit is provided and includes a piston 19 and a cylinder 20. The piston-cylinder unit at least partially dissipates the force introduced in the event of a crash by the deformation element 22 undergoing collapsing deformation. The deformation element 22 preferably is a honeycomb structure and/or an aluminum extruded profile, and is configured to permit a reliable dissipation of the force exerted in the event of a crash.

The embodiment of FIG. 3 provides a plurality of lug structures 23, 23a, 23b, . . . as a second adjusting element. The lug structures 23, 23a, 23b are arranged one behind another within the basic member 2. Again, the force exerted in the event of a crash is transmitted at least partially via the lateral fastening bracket 3 and the piston 19 into the cylinder 20 and to the first lug structure 23 lying in the direction of force. Destruction or breaking off of the first lug structure 23 dissipates a first portion of the force introduced in the event of a crash. The piston 19 then continues to move in the direction of the second lug structure 23a. The force introduced in the event of a crash is dissipated reliably without the basic member 2 fracturing by appropriately dimensioning the size and number of lug structures. In this case, the lug structures can in also be formed integrally with the basic member 2.

What is claimed is:

1. A cockpit cross member for a motor vehicle for absorbing forces exerted on the motor vehicle in a transverse direction of the motor vehicle during a crash of the motor vehicle, the cockpit cross member comprising a light-metal cast basic member, at least one fastening bracket for connecting the cockpit cross member to a body of the motor vehicle and an adjusting element provided between the basic member and fastening bracket, the adjusting element defining a piston-cylinder arrangement permitting movement between the basic member and the fastening bracket along the transverse direction, a plurality of breakable structures secured to the basic member for at least partially absorbing forces exerted on the cockpit cross member in the event of the motor vehicle crashing, the breakable structures being spaced apart and arranged one behind another in a direction of the forces in the transverse direction that are to be absorbed.

2. The cockpit cross member of claim 1, wherein the fastening bracket connects the cockpit cross member to the vehicle body in a lower region of an A pillar of the motor vehicle.

3. The cockpit cross member of claim 1, wherein the fastening bracket and the basic member are telescoped together to define the piston-cylinder arrangement.

4. The cockpit cross member of claim 1, wherein the basic member extends over substantially the vehicle width, and two lateral fastening brackets are provided for connection of the cockpit cross member to the vehicle body.

5. The cockpit cross member of claim 1, wherein at least part of adjusting element is integral with the fastening bracket.

6. The cockpit cross member of claim 3, wherein the adjusting element comprises a piston arranged on the fastening bracket, the basic member defining a cylinder, the piston being mounted for traveling in the transverse direction of the vehicle within the cylinder of the basic member in response to forces exerted on the cockpit cross member in the event of the motor vehicle crashing.

7. The cockpit cross member of claim 6 wherein the breakable structures are lugs formed in the cylinder of the basic member.

8. The cockpit cross member of claim 1, wherein the basic member is formed from cast aluminum or cast magnesium.

9. The cockpit cross member of claim 1, wherein the fastening bracket includes a first portion for connecting the fastening bracket to the body of the motor vehicle and a second portion connected to the adjusting element, the second portion of the fastening bracket being movable relative to the first portion of the fastening bracket for at least partially absorbing the forces exerted on the cockpit cross member in the event of the motor vehicle crashing.

10. The cockpit cross member of claim 9, wherein the fastening bracket is a leaf spring.

* * * * *